United States Patent [19]

Sawada

[11] Patent Number: 5,788,751
[45] Date of Patent: Aug. 4, 1998

[54] HOT-MELT TYPE INK-JET RECORDING INK COMPOSITION AND PROCESS FOR PREPARATION OF THE SAME

[75] Inventor: Hidemasa Sawada, Gifu, Japan

[73] Assignee: Brother Kogyo Kabushiki Kaisha, Nagoya, Japan

[21] Appl. No.: 777,049

[22] Filed: Dec. 30, 1996

[30] Foreign Application Priority Data

Jan. 11, 1996 [JP] Japan ................................. 8-022145

[51] Int. Cl.$^6$ ................................................. C09D 11/02
[52] U.S. Cl. ................................. 106/31.29; 106/31.41; 106/31.61; 106/31.72
[58] Field of Search ........................... 106/30 A, 31 R, 106/31.29, 31.49, 31.69, 31.72

[56] References Cited

U.S. PATENT DOCUMENTS

| | | |
|---|---|---|
| 3,653,932 | 4/1972 | Berry et al. |
| 4,390,369 | 6/1983 | Merritt et al. |
| 4,758,276 | 7/1988 | Lin et al. |
| 4,820,346 | 4/1989 | Nowak |
| 4,822,418 | 4/1989 | Lin et al. |
| 4,870,118 | 9/1989 | Kinoshita et al. |
| 5,597,856 | 1/1997 | Yu et al. ........................ 524/227 |

FOREIGN PATENT DOCUMENTS

| | | |
|---|---|---|
| A-58-108271 | 6/1983 | Japan |
| A-59-22973 | 2/1984 | Japan |
| A-61-83268 | 4/1986 | Japan |
| A-62-48774 | 3/1987 | Japan |
| A-62-112627 | 5/1987 | Japan |
| A-62-295973 | 12/1987 | Japan |

OTHER PUBLICATIONS

"Lubricants and Processing Aids," *Manufacturing Handbook & Buyer's Guide 1994/95*, Plastics Technology, vol. 40, no. 8, p. 443 (6) (Jul. 15, 1994).
"CasChem capabilities," Cambrex Corporation, 1996.
C.P. Hall Company, "Material Safety Data Sheet and Product Brochure," Feb. 1994.
'97 Chemcyclopedia Directory: Oleochemicals.
CasChem Brochure, "Paricin® 220, Fatty Acid Amide" and Paricin® 285, Fatty Acid Amide, Aug. 1987.
Witco Brochure, "Opportunities with Humko Chemical Kemamide Fatty Amides," Witco Corporation, 1985.
Remington's Pharmaceutical Sciences, 16$^{th}$ Edition, Arthur Osol, Editor, Mack Publishing Co., p. 1258, Pennsylvania (1980).
The Merck Index, 12$^{th}$ Edition, Susan Budavari, Editor, Merck and Co., Inc., New Jersey, p. 171 (1996).

*Primary Examiner*—Deborah Jones
*Attorney, Agent, or Firm*—Oliff & Berridge, PLC

[57] ABSTRACT

In a hot-melt type ink-jet recording ink composition comprising a resin, a wax and a colorant, the resin comprises an amide resin and a hydrocarbon resin, and the wax is capable of making the amide resin and the hydrocarbon resin compatible.

20 Claims, No Drawings

HOT-MELT TYPE INK-JET RECORDING INK COMPOSITION AND PROCESS FOR PREPARATION OF THE SAME

BACKGROUND OF THE INVENTION

1. Field of the Invention

This invention relates to an ink-jet recording ink composition of a hot-melt type and a process for the preparation thereof.

2. Description of the Related Art

As ink-jet recording systems, various systems are employed, e.g., an electric field control system in which electrostatic attraction is utilized to eject ink, a drop on-demand system (or pressure pulse system) in which a vibratory pressure of a piezoelectric device is utilized to eject ink, and a thermal ink-jet system in which a pressure produced by bubbles formed and grown by high heat is utilized to eject ink. These systems can provide very highly precise printed images.

In these ink-jet recording systems, water-based inks employing water as a main solvent and oil-based inks employing an organic solvent as a main solvent are commonly used. Printed images obtained using the water-based inks have a poor water resistance in general. On the other hand, the use of oil-based inks can provide printed images having a good water resistance.

However, these water-based ink and oil-based inks are liquid at room temperature, and hence have had disadvantages that feathering tends to occur when images are printed on a recording paper and that no sufficient print density can be obtained. Also, because the inks are liquid, they tend to cause formation of deposits, resulting in a great lowering of the reliability of ink-jet recording systems.

In order to overcome such disadvantages of the conventional inks which are liquid at room temperature, hot-melt type oil-based ink compositions which are solid at room temperature are proposed. U.S. Pat. No. 3,653,932 discloses an ink containing a dialkyl sebacate. U.S. Pat. No. 4,390,369 and Japanese Patent Application Laid-open No. 58-108271 disclose an ink containing a natural wax. Japanese Patent Application Laid-open No. 59-22973 discloses an ink containing a stearic acid. Japanese Patent Application Laid-open No. 61-83268 discloses an ink containing an acid or alcohol having 20 to 24 carbon atoms and a ketone having a relatively high melting point. Japanese Patent Application Laid-open No. 62-48774 discloses an ink containing a thermosetting resin having a high hydroxyl value, a solid organic solvent having a melting point higher than 150° C. and a small quantity of a dye substance. Japanese Patent Application Laid-open No. 62-112627 discloses an ink comprised of a colorant, a first solvent which is solid at room temperature and capable of liquefying upon heating to a temperature higher than the room temperature and a second solvent capable of dissolving the first solvent and being highly volatile when turns liquid. Also, Japanese Patent Application Laid-open No. 62-295973 discloses an ink containing a synthetic wax having a polar group and a dye soluble in the wax.

In such ink compositions which are solid at room temperature, amide resins or hydrocarbon resins are used as a resin, the former having superior adhesion and transparency and the latter having superior heat resistance and color fastness. However, the amide resins do not have good heat resistance and color fastness, and have not been usable when the heat resistance and color fastness are required. On the other hand, the hydrocarbon resins do not have good adhesion and transparency, and have not been usable when these performances are required.

As stated above, the amide resins and hydrocarbon resins have performances that are superior in their own ways. Hence, in order to impart such performances to hot-melt type ink compositions, one may contemplate to use a mixture of two or more kinds of resins having different properties. However, resins having performances conflicting each other commonly have different properties, and it is difficult for them to be finely dispersed each other. When not well dispersed, there is a possibility that the properties themselves inherent in the respective resins are cancelled.

SUMMARY OF THE INVENTION

The present invention was made in order to solve the above problems. Accordingly, an object of the present invention is to provide a hot-melt type ink-jet recording ink composition having superior adhesion, transparency, heat resistance and color fastness at the same time.

The above object can be achieved by a hot-melt type ink-jet recording ink composition comprising a resin, a wax and a colorant, wherein the resin comprises an amide resin and a hydrocarbon resin and the wax is capable of making the amide resin and the hydrocarbon resin compatible.

The present invention also provides a process for preparing the hot-melt type ink-jet recording ink composition, comprising the steps of:

(a) heating and dissolving a mixture of the amide resin, the hydrocarbon resin and the wax;

(b) adding the colorant to the resulting mixture;

(c) agitating the mixture; and (d) filtering the mixture obtained to give the hot-melt type ink-jet recording ink composition.

This and other objects, features and benefits of the present invention are described in or will become apparent from the following detailed description of the invention.

DESCRIPTION OF THE PREFERRED EMBODIMENTS

The hot-melt type ink-jet recording ink composition of the present invention contains a resin, a wax and a colorant.

The resin used in the present invention comprises an amide resin and a hydrocarbon resin.

There are no particular limitations on on the amide resin. For example, it may include VERSAMID 335, 725 (trade name; available from Henkel Hakusui Corporation), TOHMIDE 90, 92 (trade name; available from Fuji Kasei Kogyo Co., Ltd.), and SUNMIDE 550, 55 (trade name; available from Sanwa Kagaku Kogyo K.K.). These may each be used alone or may be used in combination of two or more kinds.

The amide resin may preferably be contained in an amount of from 5 to 50% by weight based on the weight of the resulting hot-melt type ink-jet recording ink composition. If it is in an amount less than 5% by weight, the adhesion and transparency can not be sufficient. If it is in an amount more than 50% by weight, not only the heat resistance and color fastness can not be sufficient, but also the ink may have a high melt viscosity to make it difficult for the ink to be well ejected at drive temperature of printer heads used in ink-jet recording.

There are no particular limitations on the hydrocarbon resin. For example, it may include olefin resins, vinyl resins, acrylic resins, phenol resins and petroleum resins. Stated specifically, it may include ALKON P-70, 90, 100, 115 (trade name; available from Arakawa Chemical Industries, Ltd.) an FTR-6100, 7080, 8080 (trade name; available from Mitsui Chemical Corporation). These may each be used alone or may be used in combination of two or more kinds.

The hydrocarbon resin may preferably be contained in an amount of from 5 to 60% by weight based on the weight of the resulting hot-melt type ink-jet recording ink composition. If it is in an amount less than 5% by weight, the heat resistance and color fastness can not be sufficient. If it is in an amount more than 60% by weight, not only the adhesion and transparency can not be sufficient, but also the ink may have a high melt viscosity to make it difficult for the ink to be well ejected at drive temperature of printer heads used in ink-jet recording.

The wax used in the present invention makes the amide resin and the hydrocarbon resin compatible (i.e., soluble in each other), and hence both the resins dissolve in each other upon heating.

Since the amide resin and the hydrocarbon resin are resins having properties different from each other, they can not be finely dispersed each other if they are merely kneaded as they are, to cause a coarse phase separation, so that the respectively superior performances can not be utilized in a good efficiency.

In the present invention, the use of the wax makes it possible to bring the amide resin and hydrocarbon resin into a stably dispersed state, which is called micro-phase dispersion structure (or islands-in-sea structure), and makes it possible to impart the performances inherent in the respective resins to the hot-melt type ink-jet recording ink composition.

There are no particular limitations on the above wax so long as they can make the amide resin and the hydrocarbon resin compatible. For example, it may include amide waxes such as lauric acid amide, stearic acid amide, stearyl stearic acid amide, oleic acid amide, erucic acid amide, ricinoleic acid amide, 12-hydroxystearic acid amide, special fatty acid amides, and N-substituted fatty acid amides. Stated specifically, NIKKAMIDE S, NIKKAMIDE SE, SLIPACKS O (trade names; available from Nippon Kasei Chemical Co., Ltd.). These may each be used alone or may be used in combination of two or more kinds.

In the present invention, it is preferable to use amide waxes as the wax. The amide waxes have a superior function to make the amide resin and the hydrocarbon resin compatible. In particular, stearyl stearic acid amide is preferred.

The wax may be contained in an amount of preferably from 20 to 80% by weight, more preferably from 30 to 70% by weight, further more preferably 40 to 60% by weight based on the weight of the resulting hot-melt type ink-jet recording ink composition. If it is in an amount less than 20% by weight, the function to make the resins compatible can not be well effective. If it is in an amount more than 80% by weight, the wax is in a too large quantity, resulting in poor properties for the amide resin and hydrocarbon resin. There are no particular limitations on the colorant used in the present invention so long as they are dyes or pigments commonly used in oil-based inks. The dyes are not particularly limited, and may include, e.g., oil-soluble dyes such as azo dyes, disazo dyes, metal complex dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, and metal phthalocyanine dyes. These may each be used alone or may be used in combination of two or more kinds.

The pigments are not particularly limited, and may include, e.g., carbon black, cadmium red, molybdenum red, chromium yellow, cadmium yellow, titanium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, perynone pigments, thioindigo pigments, quinopthalone pigments, and metal complex pigments. These may each be used alone or may be used in combination of two or more kinds.

The colorant may be contained in an amount of preferably from 0.1 to 10% by weight, more preferably from 0.5 to 5% by weight, further more preferably from 0.5 to 3% by weight based on the weight of the resulting hot-melt type ink-jet recording ink composition. If it is in an amount less than 0.1% by weight, printed images having a sufficient density can not be obtained. If it is in an amount more than 10% by weight, the printed images may have a poor color tone.

The amide resin of the present invention can be prepared in the following steps (a) to (d).

Step (a)

The wax, amide resin and hydrocarbon resin are heated and dissolved at a temperature of from 70° to 250° C., and preferably from 100° to 200° C.

Step (b)

To the resulting mixture, the colorant is added.

Step (c)

The mixture obtained is mixed by agitation at from 200 to 10,000 rpm, and preferably from 500 to 5,000 rpm, by means of a stirrer such as a dissolver.

Step (d)

The ink composition thus obtained is filtered with a mesh filter medium or the like to finally obtain the hot-melt type ink-jet recording ink composition.

As described above, in the hot-melt type ink-jet recording ink composition of the present invention, the wax makes the amide resin and the hydrocarbon resin compatible while providing an islands-in-sea structure. Hence, the ink composition can have good adhesion, transparency, heat resistance and color fastness at the same time and can be preferably used in ink-jet recording apparatus.

EXAMPLES

The present invention will be described below in greater detail by giving Examples. The present invention is by no means limited to only these Examples.

Example 1

As a vehicle, an amide wax (SLIPACKS O, trade name; available from Nippon Kasei Chemical Co., Ltd.) was used which is solid at room temperature, and a hydrocarbon resin (ALKON P-70, trade name; available from Arakawa Chemical Industries, Ltd.) and an amide resin (VERSAMID 335, trade name; available from Henkel Hakusui Corporation) were used as a resin. C.I. Solvent Yellow 162 (NEOPEN YELLOW 075, trade name; available from BASF Corp.) was used as a colorant.

Ink formulation:

| | |
|---|---|
| SLIPACKS O | 25% by weight |
| ALKON P-70 | 34% by weight |
| VERSAMID 335 | 40% by weight |
| NEOPEN YELLOW 075 | 1% by weight |

SLIPACKS O, ALKON P-70 and VERSAMID 335 were heated and dissolved at a temperature of 180° C., and then NEOPEN YELLOW 075 was mixed. The mixture obtained was mixed by agitation at 3,000 rpm by means of a dissolver. The ink composition thus prepared was filtered using a 2 μm mesh filter medium by means of a heat filter to obtain a final ink composition.

The ink composition thus obtained was melted on a hot plate heated to 110° C., and then coated on an OHP sheet (PP-2500, available from Sumitomo 3M Limited) using a wire-wound rod (winding wire diameter: 0.9 mm). As a result, a transparent ink film with a clear color was obtained.

The ink composition was also set in an ink-jet recording apparatus (HS-1, manufactured by Brother Kogyo Kabushiki Kaisha) to print images. As a result, sharp printed images were obtained, enjoying a good ink fixing performance.

Example 2

As a vehicle, an amide wax (NIKKAMIDE SE, trade name; available from Nippon Kasei Chemical Co., Ltd.) was used which is solid at room temperature, and a hydrocarbon resin (ALKON P-90, trade name; available from Arakawa Chemical Industries, Ltd.) and an amide resin (VERSAMID 335, trade name; available from Henkel Hakusui Corporation) were used as a resin. C.I. Solvent Yellow 162 (NEOPEN YELLOW 075, trade name; available from BASF Corp.) was used as colorant.
Ink formulation:

| | |
|---|---|
| NIKKAMIDE SE | 50% by weight |
| ALKON P-90 | 20% by weight |
| VERSAMID 335 | 29% by weight |
| NEOPEN YELLOW 075 | 1% by weight |

NIKKAMIDE SE, ALKON P-90 and VERSAMID 335 were heated and dissolved at a temperature of 180° C., and then NEOPEN YELLOW 075 was mixed. The mixture obtained was mixed by agitation at 3,000 rpm by means of a dissolver. The ink composition thus prepared was filtered using a 2 μm mesh filter medium by means of a heat filter to obtain a final ink composition.

The ink composition thus obtained was melted on a hot plate heated to 110° C., and then coated on an OHP sheet (PP-2500, available from Sumitomo 3M Limited) using a wire-wound rod (winding wire diameter: 0.9 mm). As a result, a transparent ink film with a clear color was obtained.

The ink composition was also set in the ink-jet recording apparatus to print images. As a result, sharp printed images were obtained, enjoying a good ink fixing performance.

Example 3

As a vehicle, stearyl stearic acid amide was used which is solid at room temperature, and a hydrocarbon resin (ALKON P-70, trade name; available from Arakawa Chemical Industries, Ltd.) and an amide resin (VERSAMID 335, trade name; available from Henkel Hakusui Corporation) were used as a resin. C.I. Solvent Yellow 162 (NEOPEN YELLOW 075, trade name; available from BASF Corp.) was used as a colorant.
Ink formulation:

| | |
|---|---|
| Stearyl stearic acid amide | 34% by weight |
| ALKON P-70 | 30% by weight |
| VERSAMID 335 | 35% by weight |
| NEOPEN YELLOW 075 | 1% by weight |

The stearyl stearic acid amide, ALKON P-70 and VERSAMID 335 were heated and dissolved at a temperature of 180° C., and then NEOPEN YELLOW 075 was mixed. The mixture obtained was mixed by agitation at 3,000 rpm by means of a dissolver. The ink composition thus prepared was filtered using a 2 μm mesh filter medium by means of a heat filter to obtain a final ink composition.

The ink composition thus obtained was melted on a hot plate heated to 110° C., and then coated on an OHP sheet (PP-2500, available from Sumitomo 3M Limited) using a wire-wound rod (winding wire diameter: 0.9 mm). As a result, a transparent ink film with a clear color was obtained.

The ink composition was also set in the ink-jet recording apparatus to print images. As a result, sharp printed images were obtained, enjoying a good ink fixing performance.

Comparative Example 1

As a vehicle, a paraffin wax (paraffin wax standard product 155, available from Nippon Seiro Co., Ltd.) was used which is solid at room temperature, and a hydrocarbon resin (ALKON P-70, trade name; available from Arakawa Chemical Industries, Ltd.) and an amide resin (VERSAMID 335, trade name; available from Henkel Hakusui Corporation) were used as a resin. C.I. Solvent Yellow 162 (NEOPEN YELLOW 075, trade name; available from BASF Corp.) was used as a colorant.
Ink formulation:

| | |
|---|---|
| Paraffin wax standard product 155 | 25% by weight |
| ALKON P-70 | 34% by weight |
| VERSAMID 335 | 40% by weight |
| NEOPEN YELLOW 075 | 1% by weight |

Paraffin wax standard product 155, ALKON P-70 and VERSAMID 335 were heated and dissolved at a temperature of 180° C., and then NEOPEN YELLOW 075 was mixed. The mixture obtained was mixed by agitation at 3,000 rpm by means of a dissolver. The ink composition thus prepared was filtered using a 2 μm mesh filter medium by means of a heat filter to obtain a final ink composition.

The ink composition thus obtained was melted on a hot plate heated to 110° C., and then coated on an OHP sheet (PP-2500, available from Sumitomo 3M Limited) using a wire-wound rod (winding wire diameter: 0.9 mm). As a result, the transparency of the ink film formed was clearly lower than that in Example 1.

The ink composition was also set in the ink-jet recording apparatus. As a result, sharp printed images were not obtained.

Comparative Example 2

As a vehicle, an amide wax (NIKKAMIDE SE, trade name; available from Nippon Kasei Chemical Co., Ltd.) was used which is solid at room temperature, and a hydrocarbon resin (ALKON P-70, trade name; available from Arakawa Chemical Industries, Ltd.) and an amide resin (VERSAMID 335, trade name; available from Henkel Hakusui Corporation) were used as a resin. C.I. Solvent Yellow 162 (NEOPEN YELLOW 075, trade name; available from BASF Corp.) was used as a colorant.

Ink formulation:

| | |
|---|---|
| NIKKAMIDE SE | 5% by weight |
| ALKON P-70 | 40% by weight |
| VERSAMID 335 | 44% by weight |
| NEOPEN YELLOW 075 | 1% by weight |

NIKKAMIDE SE, ALKON P-70 and VERSAMID 335 were heated and dissolved at a temperature of 180° C., and then NEOPEN YELLOW 075 was mixed. The mixture obtained was mixed by agitation at 3,000 rpm by means of a dissolver. The ink composition thus prepared was filtered using a 2 μm mesh filter medium by means of a heat filter to obtain a final ink composition.

The ink composition thus obtained was melted on a hot plate heated to 110° C., and then coated on an OHP sheet (PP-2500, available from Sumitomo 3M Limited) using a wire-wound rod (winding wire diameter: 0.9 mm). As a result, the transparency of the ink film formed was clearly lower than that in Example 1.

The ink composition was also set in the ink-jet recording apparatus. As a result, sharp printed images were not obtained.

What is claimed is:

1. A hot-melt ink-jet recording ink composition comprising a resin, a wax and a colorant, wherein said resin comprises an amide resin and a hydrocarbon resin, and wherein said wax makes said amide resin compatible with said hydrocarbon resin.

2. The hot-melt ink-jet recording ink composition according to claim 1, wherein said wax is an amide wax.

3. The hot-melt ink-jet recording ink composition according to claim 2, wherein said amide wax includes lauric acid amide, stearic acid amide, stearyl stearic acid amide, oleic acid amide, erucic acid amide, ricinoleic acid amide, 12-hydroxystearic acid amide, special fatty acid amide or N-substituted fatty acid amide.

4. The hot-melt ink-jet recording ink composition according to claim 3, wherein said amide wax includes stearyl stearic acid amide.

5. The hot-melt ink-jet recording ink composition according to claim 1, wherein said wax is contained in an amount of 20 to 80% by weight based on the weight of the hot-melt ink-jet recording ink composition.

6. The hot-melt ink-jet recording ink composition according to claim 5, wherein said wax is contained in an amount of 30 to 70% by weight based on the weight of the hot-melt ink-jet recording ink composition.

7. The hot-melt ink-jet recording ink composition according to claim 6, wherein said wax is contained in an amount of 40 to 60% by weight based on the weight of the hot-melt ink-jet recording ink composition.

8. The hot-melt ink-jet recording ink composition according to claim 1, wherein said hydrocarbon resin is selected from the group consisting of an olefin resin, a vinyl resin, an acrylic resin, a phenol resin and a petroleum resin.

9. The hot-melt ink-jet recording ink composition according to claim 1, wherein said hydrocarbon resin is contained in an amount of 5 to 60% by weight based on the weight of the hot-melt ink-jet recording ink composition.

10. The hot-melt ink-jet recording ink composition according to claim 1, wherein said amide resin is contained in an amount of 5 to 50% by weight based on the weight of the hot-melt ink-jet recording ink composition.

11. The hot-melt ink-jet recording ink composition according to claim 1, wherein said amide resin is contained in an amount of 5 to 50% by weight, said hydrocarbon resin in an amount of from 5 to 60% by weight, and said wax in an amount of from 20 to 80% by weight, based on the weight of the hot-melt ink-jet recording ink composition.

12. The hot-melt ink-jet recording ink composition according to claim 1, wherein said colorant is contained in an amount of 0.1 to 10% by weight based on the weight of the hot-melt ink-jet recording ink composition.

13. The hot-melt ink-jet recording ink composition according to claim 12, wherein said colorant is contained in an amount of 0.5 to 5% by weight based on the weight of the hot-melt ink-jet recording ink composition.

14. The hot-melt ink-jet recording ink composition according to claim 13, wherein said colorant is contained in an amount of 0.5 to 3% by weight based on the weight of the hot-melt ink-jet recording ink composition.

15. A process for preparing a hot-melt ink-jet recording ink composition comprising a resin, a wax and a colorant, said resin comprising an amide resin and a hydrocarbon resin, and said wax being capable of making said amide resin and said hydrocarbon resin compatible, comprising the steps of:

(a) heating and dissolving a mixture of said amide resin, said hydrocarbon resin and said wax;

(b) adding the colorant to the resulting mixture;

(c) agitating the mixture; and (d) filtering the mixture obtained to give the hot-melt ink-jet recording ink composition.

16. The process according to claim 15, wherein, in the step (a), said mixture is heated at a temperature of from 70° to 250° C.

17. The process according to claim 16, wherein, in the step (a), said mixture is heated at a temperature of from 100° to 200° C.

18. The process according to claim 15, wherein said wax is an amide wax.

19. The process according to claim 18, wherein said amide wax includes lauric acid amide, stearic acid amide, stearyl stearic acid amide, oleic acid amide, erucic acid amide, ricinoleic acid amide, 12-hydroxystearic acid amide, special fatty acid amide or N-substituted fatty acid amide.

20. The process according to claim 15, wherein said amide resin is contained in an amount of 5 to 50% by weight, said hydrocarbon resin in an amount of from 5 to 60% by weight, and said wax in an amount of from 20 to 80% by weight, based on the weight of the hot-melt type ink-jet recording ink composition.

* * * * *